Patented Apr. 25, 1933

1,905,327

UNITED STATES PATENT OFFICE

JOHN H. ZUMWALT, OF TACOMA, WASHINGTON

METHOD AND COMPOSITION FOR PRESERVING WOOD

No Drawing.    Application filed January 8, 1930. Serial No. 419,460.

My said invention relates to the treatment of wood and similar or analogous materials with a view to making them fire proof and also serving as an insecticide and fungicide and the invention aims to provide a method of treatment and a composition for use in such method which will be economical and efficacious.

The invention also aims to provide a composition and method by the use of which a product will be secured which will not be affected by moisture or humidity.

With these and other objects in view the invention includes the novel method and composition hereinafter described and defined by the appended claims.

In proceeding according to my improved method I prepare a mixture of an aqueous solution of sodium silicate and a solution of or containing sodium arsenate. Preferably I use a sodium silicate solution of approximately 15% of sodium silicate, and a sodium arsenate solution of approximately one half of one percent, and I prefer to use for this latter solution arsenious trioxide. The sodium silicate, being dilute and having an alkaline reaction holds the silica and arsenius trioxide in solution.

The wood to be treated is placed in a drum or container capable of being hermetically closed and the air is exhausted therefrom, whereupon the solution of sodium silicate and arsenious acid is injected or pumped into the container and subjected to sufficient pressure to cause it to enter the pores of the wood.

The excess solution is then drawn off and preferably the treated wood is subjected to a low or partial vacuum. The wood is then subjected to the action of dilute solution of sulphuric acid by injecting or pumping the solution into the container, a two or two and one half percent acid solution having been found to be the best proportion, for the amount of alkali above described. This acid solution is preferably warmed and allowed to stand for the desired length of time which causes silicic acid to be precipitated in a colloidal state in the pores of the wood and effects a like precipitation of the sodium arsenate which is held in the colloidal silicic acid.

After draining off the excess sulphuric acid the treated material is dried, either in the open air or in a kiln, which effects dehydration or drives off the water, converting the silicic acid into silica which with the arsenate remains in the pores of the wood. The drying also seals the pores of the wood.

Obviously I do not limit myself to the precise proportions specified as those may be varied according to the circumstances of the case, as for example the character of the wood treated and the particular purposes for which it is to be used.

Likewise I do not limit myself to the treatment of wood as the process and treating material are applicable to other materials which it is desired to preserve in a similar manner.

Having thus described my invention, what I claim is:

1. The process of treating wood and similar materials which consists in impregnating it with a solution of sodium silicate and sodium arsenate, and then subjecting the impregnated wood to the action of an acid to precipitate the silica and sodium arsenate and enclose the sodium arsenate in the hydrated silicic acid.

2. The process of treating wood and similar materials which consists in impregnating it with a solution containing approximately fifteen percent of alkaline silicate and one percent of sodium arsenate, and treating the impregnated wood with approximately two percent solution of sulphuric acid.

In testimony whereof, I affix my signature.

JOHN H. ZUMWALT.